Aug. 26, 1941.　　　G. PETRUCCI　　　2,253,808
COMBINED CARRYALL AND DRAG SCRAPER
Filed Feb. 20, 1940　　　2 Sheets-Sheet 2
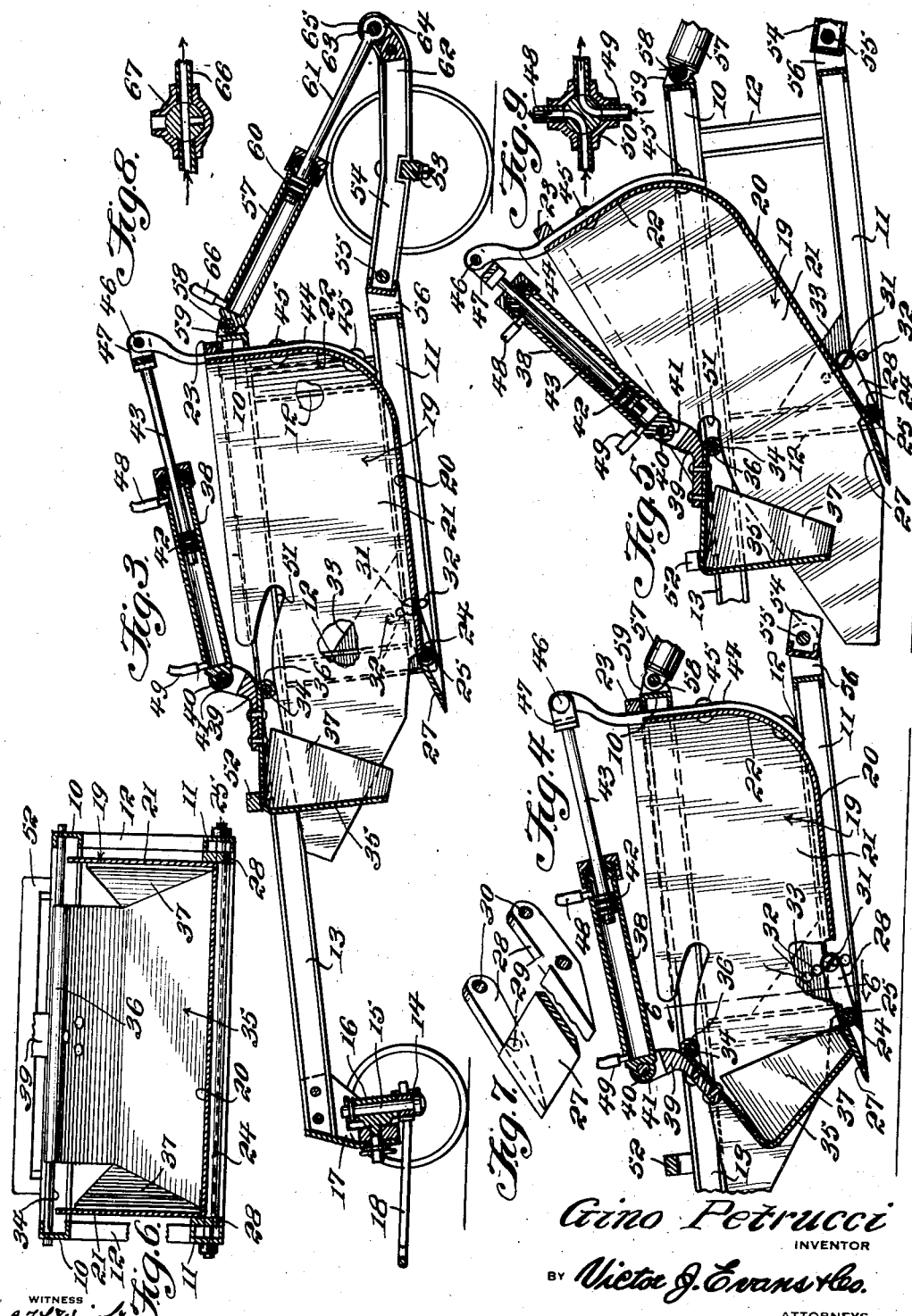
Gino Petrucci
INVENTOR
BY Victor J. Evans & Co.
ATTORNEYS Patented Aug. 26, 1941

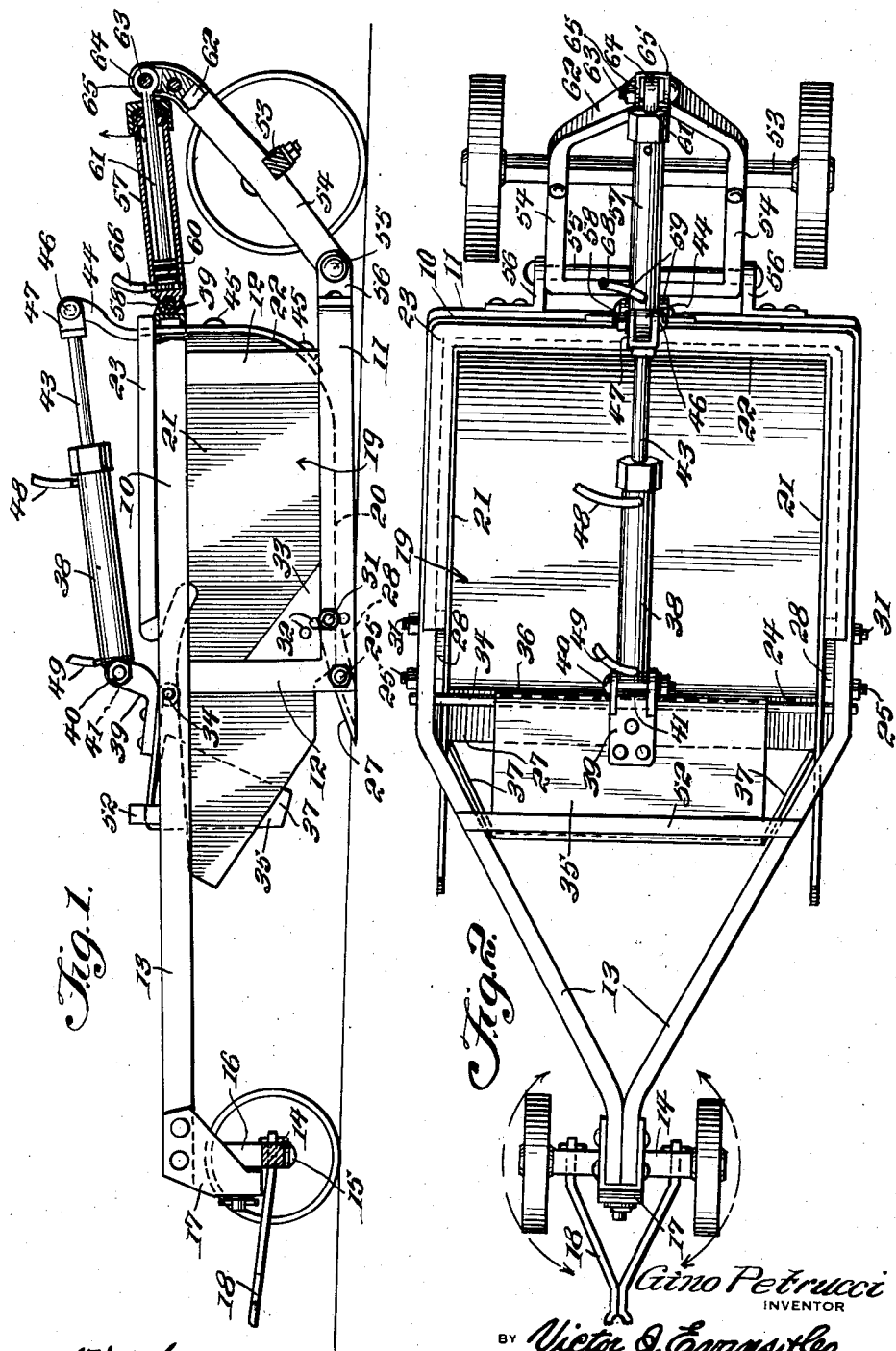

2,253,808

UNITED STATES PATENT OFFICE 2,253,808

COMBINED CARRYALL AND DRAG SCRAPER

Gino Petrucci, Madera, Calif.

Application February 20, 1940, Serial No. 319,947

5 Claims. (Cl. 37—126)

This invention relates to a combined carry-all and drag scraper of the type whereby a load of material may be scooped up and carried to a point of use or place of distribution and there discharged, the present device being adapted to be tractor drawn to handle large volumes of material.

An object of the present invention is to provide a scoop supported upon a wheeled frame and adjustable thereon to vary the depth to which the blade enters the ground.

A further object is to provide a device of this character having pneumatic means for controlling the raising, lowering, tilting and dumping of the scoop and for actuation of the gate from open to closed positions.

A further object is to provide a device of this character which will be formed of a few strong, simple and durable parts, which will be inexpensive to manufacture, and which will not easily get out of order.

With the above and other objects in view the invention consists of certain novel details of construction and combinations of parts hereinafter fully described and claimed, it being understood that various modifications may be resorted to within the scope of the appended claims without departing from the spirit or sacrificing any of the advantages of the invention.

In the accompanying drawings forming a part of this specification:

Figure 1 is a side elevation of a combined carry-all and drag scraper constructed in accordance with the invention and shown in position to cause the blade to enter the ground.

Figure 2 is a plan view of the device shown in Figure 1.

Figure 3 is a longitudinal sectional view of the device showing the scoop elevated and the gate open for transportation.

Figure 4 is a detail longitudinal sectional view of the scoop shown in load-carrying position with the gate closed.

Figure 5 is a detail longitudinal sectional view shown in dumping position with the gate open.

Figure 6 is a cross sectional view taken on the line 6—6 of Figure 4 looking in the direction of the arrows.

Figure 7 is a detail perspective view of the scoop and hinge arms thereof.

Figure 8 is a detail cross sectional view of the valve for controlling the pneumatic cylinder which elevates the scoop to the position shown in Figure 3.

Figure 9 is a detail cross sectional view of the valve for controlling the pneumatic cylinder which actuates the scoop and gate in load-carrying and dumping positions shown in Figures 4 and 5.

Referring now to the drawings in which like characters of reference designate similar parts in the various views, the present vehicle is in the nature of a trailer including a U-shaped frame structure comprising an upper U-shaped bar 10, a lower U-shaped bar 11 and spaced upright bars 12 connecting the upper and lower bars on both sides. The sides of the upper frame bar 10 are extended forwardly and directed toward each other to provide a V-shaped beam 13, the front end of which is supported on a small wheeled axle 14 to permit a sharp turn. The axle is mounted to swing on a pivot pin 15 carried in a bearing 16 which is secured to a bracket 17 which extends downward from the front end of the beam, as best shown in Figure 3. A tongue 18 is secured to the axle.

A scoop 19 for gathering dirt, sand, or other material, is disposed within the U-shaped frame structure and comprises a bottom 20, side walls 21, and a rear wall 22, these walls being connected at the top by a U-shaped flange 23 which overlies and engages the top frame bar 10 to maintain the scoop in normal gravitated position. The scoop is pivotally connected to the U-shaped frame structure at the forward end and for this purpose the bottom 20 of the scoop is provided at the front end with a tubular transversely disposed bearing 24, best shown in Figure 3, through which a shaft 25 is engaged. The ends of the shaft are journaled in bearing openings 26 formed in the lower ends of the front vertical frame bars 12, as best shown in Figure 1. The scoop may be rocked on the shaft to the position shown in Figure 1 for scraping material into the scoop as it is moved forward, or to the position shown in Figure 5 when the collected material is to be dumped.

A scraper blade 27 is mounted adjacent the pivoted forward edge of the scoop in advance of the scoop. As best shown in Figure 7 the blade is provided with a pair of parallel rearwardly extending arms 28 which are provided with openings 29 near the rear edge of the blade to pivotally receive the pivot shaft 25 outside of the ends of the tubular bearing 26. The arms are provided at the rear ends with aligned openings 30 which receive adjusting bolts 31 passed selectively through an arcuate series of openings 32 formed concentric with the pivot shaft 25 in the bottom bars 11 of the frame structure and in triangular extensions 33 which extend from the front bars 12 of the frame structure rearwardly along the sides 19 of the scoop. By disposing the bolts in any pre-determined aligned pair of the openings 32 the inclination of the blade to the earth may be adjusted to make a shallow or a deep cut.

A pivot shaft 34 extends transversely across the sides of the upper frame bar 10 near the triangular beam 13. A substantially right angular gate 35 is provided on the upper longitudinal edge with a tubular bearing 36, best shown in Figure 6, which receives the pivot shaft 34 to hingedly connect the gate at the top to the frame structure. The gate is provided at the sides with wings 37 which extend rearwardly along the sides 19 of the scoop to prevent the gathered dirt or other material from escaping laterally from the gate when the gate is closed as shown in Figure 4.

A pneumatic cylinder 38 is mounted centrally of the gate adjacent its upper edge through the medium of an angular bracket arm 39 which is secured to the gate near the pivot shaft thereof and a pivot pin 40 is passed through the bracket and through a hinge eye 41 on one end of the cylinder. A piston 42 is mounted in the cylinder and has a piston rod 43 which is connected to the upper end of a bracket 44, riveted as shown at 45 to the rear wall of the scoop, by a pivot pin 46 passed through the upper end of the bracket and through hinge lugs 47 on the piston rod.

A pipe 48 for a fluid pressure medium, such as compressed air, enters the cylinder near one end thereof and a pipe 49 for the fluid pressure medium enters the other end of the cylinder. A four-way valve 50, best shown in Figure 9, is connected to the pipes 48 and 49 and controls admission of the fluid pressure medium to one end of the cylinder and exhaust of the same from the other end of the cylinder when the valve is turned to active position.

When the fluid pressure medium is let into the cylinder through the pipe 49 the cylinder 38 will be moved forwardly on the piston to move the gate from the open position shown in Figure 3 to the closed position, shown in Figure 4, to transport a load of material within the scoop. When the compressed fluid pressure medium is let into the cylinder behind the piston through the pipe 48, first air will exhaust from the cylinder ahead of the piston to contract the jack formed by the cylinder 38 and piston rod 43. Due to the fact that the scoop offers greater resistance to movement than does the gate, the gate will move first until it reaches its limit of travel against a stop bar 52, later described, whereupon further contraction of the jack will tilt the scoop to the position shown in Figure 5 for dumping the contents of the scoop. Conversely to permit the scoop to return to normal loading position air is applied to the opposite end of the cylinder through the pipe 49 to expand the jack and due to its greater weight, the scoop will return to its normal position. Only after the scoop has reached its normal position will the gate be moved down by continued application of fluid pressure medium to extend the jack further.

For guiding the scoop in its tilting movement a pair of arcuate slots 51 are disposed in alignment near the upper edges of the sides 12, concentric with the pivot shaft 24 of the scoop. The slots receive the pivot shaft 34 of the gate, as best shown in Figures 4 and 5, to permit the scoop to be tilted. When the scoop is tilted to dumping position as shown in Figure 5, the pivot shaft 34 is disposed near the inner ends of the slots and when the scoop is disposed in load carrying position as shown in Figure 4, the pivot shaft 34 is disposed beyond the outer ends of the slots.

For limiting open movement of the gate an inverted U-shaped stop bar 52 is secured transversely of the sides of the V-shaped beam 13 above the gate, as best shown in Figures 3 and 6. When the gate is swung to open position, as shown in Figure 3, the gate will engage the stop bar 52 and be limited thereby in opening movement.

A wheeled axle 53 supports the frame structure of the scoop beyond the rear wall 22 of the scoop. The axle is bolted to the sides 54 of a U-shaped carriage frame. A pivot shaft 55 is passed through the sides of the carriage frame near the transverse member thereof and through hinge lugs 56 which project from the transverse member of the lower bar 11 of the frame structure of the scoop, on opposite sides of the center thereof, as best shown in Figure 2.

For rocking the frame structure of the scoop on the wheels of the carriage frame 54 as a fulcrum, to raise and lower the scoop respectively to the traveling position shown in Figure 3, and to the operative position shown in Figure 1, a pneumatic cylinder 57 is disposed centrally of the carriage frame and is pivotally connected at the upper end to the transverse member of the upper frame bar 10 of the scoop frame structure through the medium of a pivot pin 58 passed through hinge ears 59 carried by the frame bar. A piston 60 is disposed in the cylinder and has a piston rod 61 which is pivotally connected to a yoke 62, formed integral with the carriage frame 54, through the medium of a pivot pin 63 passed through an eye 64 on the piston rod and through hinge ears 65 on the free end of the yoke.

A pipe 66 for a fluid pressure medium is connected to the cylinder near the upper end thereof and is controlled by a three-way valve 67 shown in Figure 8. To raise the frame structure of the scoop to travelling position shown in Figure 3, the pressure medium is let into the upper end of the cylinder and urges the piston downwardly to elevate the frame structure of the scoop to the travelling position shown in Figure 3. When it is desired to lower the frame structure and scoop to the operative position shown in Figure 1, the valve is turned to release the air from above the piston so that the weight of the scoop and main frame moves the piston and piston rod upwardly in the cylinder to dispose the frame structure and scoop in the operative position.

Since the operation of the device has been described as the description of the parts progressed, it is thought the invention will be fully understood without further explanation.

What is claimed is:

1. A combined carry-all and drag scraper comprising a frame, the upper portion of the frame being extended forwardly to form a beam, a wheeled axle on the beam, a scoop pivoted at its forward lower edge within the frame, a flange at the upper edge of the scoop overlying the top of the frame to maintain the scoop in normal position, a scraper blade disposed transversely of the frame adjacent the pivoted edge of the scoop and in advance thereof, a shaft extending across the top of the frame above the blade, a gate of right angular cross section pivotally mounted at its upper longitudinal edge on said shaft, stop means carried by the frame for limiting opening movement of the gate, a pneumatic cylinder disposed above the center of the gate and hingedly connected at one end to the gate, a piston in the cylinder pivotally connected to the top of the rear wall of the scoop, means for supplying fluid pressure medium to one end of the cylinder for causing the gate to be rocked open until limited by said stop means and subsequently causing tilting of the scoop to release material from the scoop, a wheeled carriage hingedly mounted on the frame in rear of the scoop, a second pneumatic cylinder hingedly mounted on the outer end of the wheeled carriage, a piston for the second cylinder hingedly connected to the frame at the top of the scoop, and means for admitting fluid pressure medium to the second cylinder for causing the frame to be tilted to engage the scraper blade in operative position at the desired depth.

2. A combined carry-all and drag scraper comprising a frame structure having a frame, a beam extending forwardly from the frame, a wheeled axle pivotally connected to the beam, a draft tongue on the axle, a scoop pivotally connected at the bottom of the open front end thereof to the frame below the inner end of the beam, a gate of right angular cross section pivoted to the frame at the inner end of the beam, a transversely disposed bar on the frame limiting upward opening movement of the gate, a scraper blade on the lower open end of the frame in advance of the pivot of the scoop, a stop flange on the upper portion of the scoop engaging the frame to hold the scoop in normal horizontal position, a pneumatic cylinder and piston above the gate hingedly connected respectively to the gate and to the rear wall of the scoop, means for supplying fluid pressure medium to one end of the cylinder for causing the gate to be rocked open until limited by said transversely disposed bar and subsequently causing tilting of the scoop to release material from the scoop, means for supplying fluid pressure medium to the other end of the cylinder to permit the scoop to gravitate to normal position and subsequently close the gate, and a wheeled carriage mounted on the frame in rear of the scoop.

3. A combined carry-all and drag scraper comprising a frame, a beam extending forwardly from the top of the frame, a wheeled axle on the beam, a scoop having a bottom and rear and side walls, a stop flange on the top of said walls engaging the top of the frame to hold the scoop in normal travelling position, a pivot shaft carried by the lower front end of the frame, a tubular bearing on the front edge of the bottom of the scoop receiving the pivot shaft, a pivot shaft carried by the top of the frame above the first named pivot shaft, a gate of right angular cross section in the front end of the scoop, a tubular bearing on the upper rear edge of the gate receiving the second named pivot shaft, a transversely disposed bar on the frame for limiting upward opening movement of the gate, a scraper blade on the lower end of the frame in advance of the scoop, a pneumatic cylinder and piston above the gate hingedly connected respectively to the gate and to the top of the rear wall of the scoop, means for supplying fluid pressure medium to one end of the cylinder for causing the gate to be rocked open until limited by said transversely disposed bar and subsequently causing tilting of the scoop to release material from the scoop, means for supplying fluid pressure medium to the other end of the cylinder to permit the scoop to gravitate to normal position and subsequently close the gate, and a wheeled carriage mounted on the frame in rear of the scoop.

4. A combined carry-all and drag scraper comprising a frame, a beam extending forwardly from the top of the frame, a wheeled axle on the beam, a scoop having a bottom, rear and side walls, a stop flange on the top of said walls engaging the top of the frame to hold the scoop in normal travelling position, a gate in the open front end of the scoop, said gate being of right angular cross section and having a horizontal top portion and a vertical front portion, the horizontal top portion being pivoted at the rear edge to the top of the frame, wings connecting the horizontal top portion and the vertical front portion of the gate and overlapping said side walls of the scoop to prevent the contents of the scoop escaping laterally from the scoop when the gate is closed, a transversely disposed bar on the frame for limiting upward opening movement of the gate, pivot means connecting the lower front end of the scoop to the frame below the gate, a scraper blade mounted transversely on the frame in advance of the scoop and below the gate, a pneumatic cylinder and piston above the gate hingedly connected to the gate and to the scoop, means for supplying fluid pressure medium to one end of the cylinder for causing the gate to be rocked open until limited by said transversely disposed bar and subsequently causing tilting of the scoop to release material from the scoop, means for supplying fluid pressure medium to the other end of the cylinder to permit the scoop to gravitate to normal position and subsequently close the gate, and a wheeled carriage mounted on the frame in rear of the scoop.

5. A combined carry-all and drag scraper comprising a U-shaped frame structure including upper and lower U-shaped bars connected together by vertical bars, the sides of the upper bar being extended forwardly in converging relationship to form a beam, a wheeled axle pivoted on the beam to swing under the beam and support the front end of the frame structure, a wheeled carriage connected to the rear transverse member of the lower frame bar to support the frame structure at the rear end thereof, a scoop pivoted at the front of its bottom to swing on a horizontal axis in the enclosure of the U-shaped frame structure, a gate pivoted at the top to the upper bar of the frame structure to swing on a horizontal axis to open and closed position in the open front of the scoop, a transversely disposed bar on the upper bar of the frame structure for limiting upward opening movement of the gate, a scraper blade mounted on the frame structure below and in advance of the scoop, a pneumatic cylinder and piston hingedly connected to the gate and to the scoop, means for supplying fluid pressure medium to one end of the cylinder for causing the gate to be rocked open until limited by said transversely disposed bar and subsequently causing tilting of the scoop to release material from the scoop, and means for supplying fluid pressure medium to the other end of the cylinder to permit the scoop to gravitate to normal position and subsequently close the gate.

GINO PETRUCCI.